US008605201B2

(12) United States Patent
Hongu

(10) Patent No.: US 8,605,201 B2
(45) Date of Patent: Dec. 10, 2013

(54) IMAGE CAPTURING APPARATUS, METHOD OF CONTROLLING THE SAME, AND STORAGE MEDIUM

(75) Inventor: Hideyasu Hongu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 12/947,440

(22) Filed: Nov. 16, 2010

(65) Prior Publication Data

US 2011/0157456 A1  Jun. 30, 2011

(30) Foreign Application Priority Data

Dec. 25, 2009 (JP) ................................. 2009-296388

(51) Int. Cl.
*H04N 5/232* (2006.01)

(52) U.S. Cl.
USPC ........................................................ 348/345

(58) Field of Classification Search
USPC .............. 348/240.99, 240.1–240.3, 345–356; 396/79–83, 88–152; 250/201.4, 201.6, 250/201.7; 352/139–140; 382/255; 359/696, 698
See application file for complete search history.

(56) References Cited

U.S. PATENT DOCUMENTS

| 8,072,851 B2 * | 12/2011 | Yamanaka | 369/44.28 |
| 2005/0052564 A1 * | 3/2005 | Ishii | 348/345 |
| 2009/0073304 A1 * | 3/2009 | Kumagai et al. | 348/345 |

FOREIGN PATENT DOCUMENTS

| CN | 1856021 A | 11/2006 |
| CN | 101071252 A | 11/2007 |
| JP | 06-014237 A | 1/1994 |
| JP | 2003-241069 A | 8/2003 |
| JP | 2006-023383 A | 1/2006 |
| JP | 2007-225713 | 9/2007 |

OTHER PUBLICATIONS

The above references were cited in a Oct. 15, 2012 Chinese Office Action, which is enclosed with English Translation, that issued in Chinese Patent Application No. 201010621005.8.
The above foreign patent documents were cited in a Jul. 22, 2013 Japanese Office Action, which is enclosed without an English Translation, that issued in Japanese Patent Application No. 2009-296388.

\* cited by examiner

*Primary Examiner* — James M Hannett
*Assistant Examiner* — Akshay Trehan
(74) *Attorney, Agent, or Firm* — Cowan, Liebowitz & Latman, P.C.

(57) ABSTRACT

The present invention provides an image capturing apparatus including an image capturing unit configured to photoelectrically convert an image of an object formed by an image capturing optical system to generate an image signal, a generation unit configured to generate, from the image signal generated by the image capturing unit, an evaluation value representing an in-focus state of the image capturing optical system, an adjusting unit configured to perform focus detection by adjusting relative positions of the image capturing unit and a focusing lens included in the image capturing optical system so as to maximize the evaluation value generated by the generation unit, and a determination unit configured to determine, during the focus detection by the adjusting unit, whether the object exists in a specific region defined in advance in the image capturing optical system in a range shorter than a predetermined distance.

11 Claims, 15 Drawing Sheets

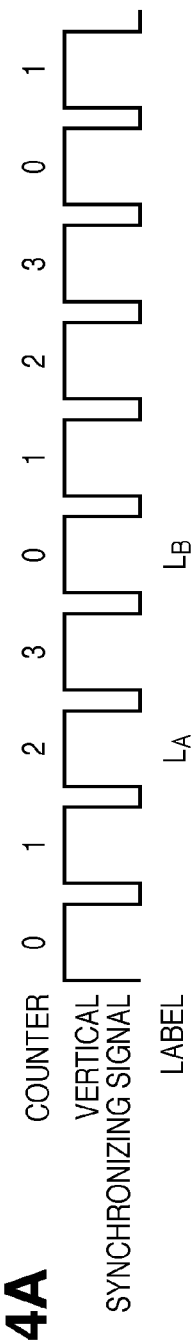
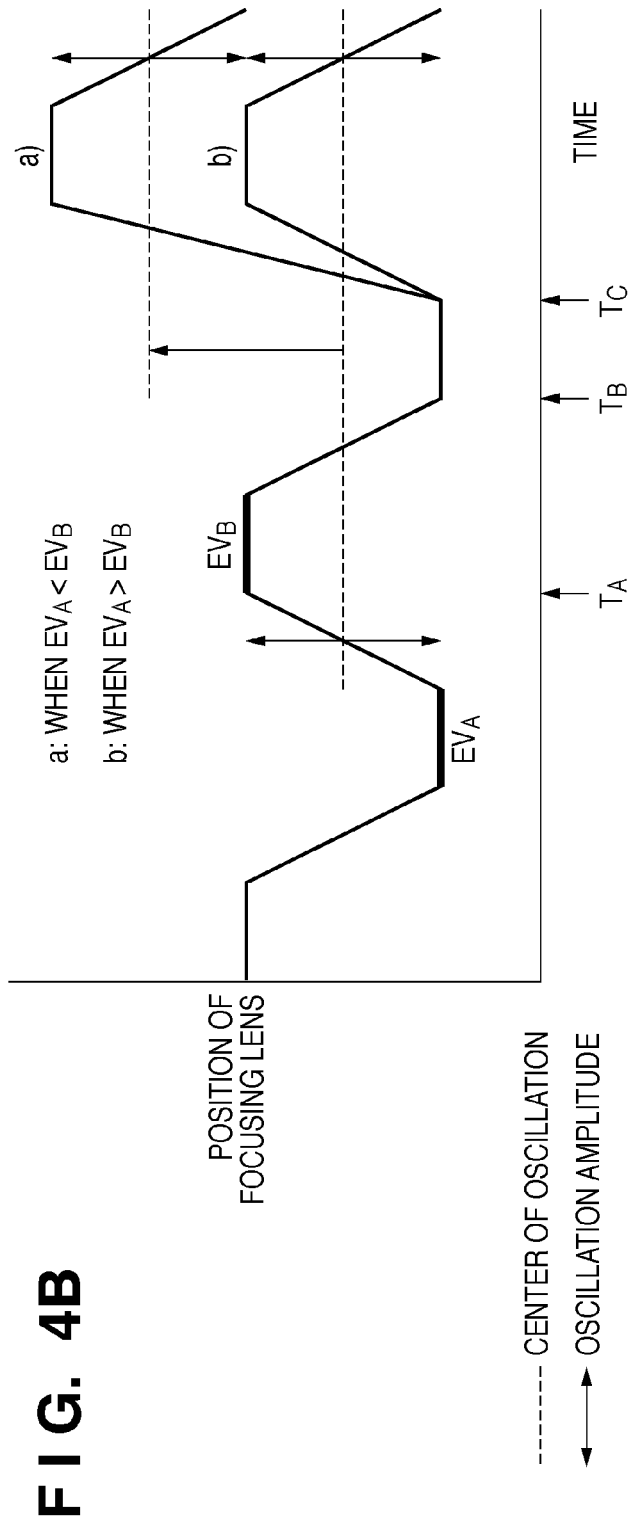
FIG. 4A
FIG. 4B

F I G. 7
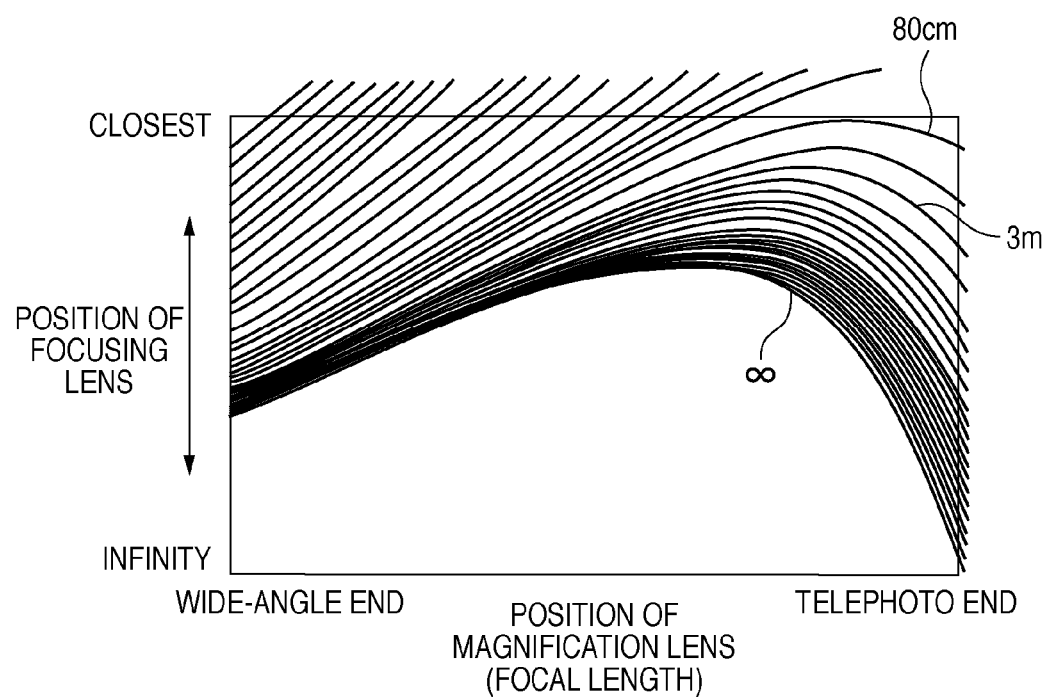

F I G. 12
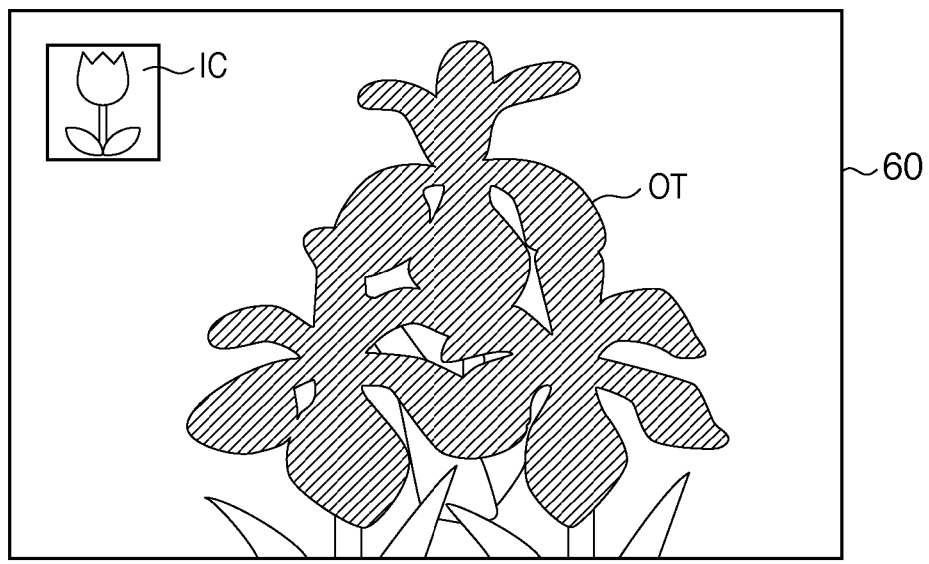

IMAGE CAPTURING APPARATUS, METHOD OF CONTROLLING THE SAME, AND STORAGE MEDIUM

BACKGROUND OF THE INVENTION

1. Field of the Invention

The present invention relates to an image capturing apparatus, a method of controlling the same, and a storage medium.

2. Description of the Related Art

Some image capturing apparatuses such as digital video cameras and digital still cameras have a so-called macro image capturing function of allowing to select a normal image capturing mode or a macro image capturing mode. Such an image capturing apparatus causes the user (operator) to estimate the distance to the object by eye and select one of the image capturing modes via a selector button or the like. When the user selects the macro image capturing mode, the distance up to the object (that is, the distance between the image capturing apparatus and the object) is short. Hence, control unique to the macro image capturing mode is performed by, for example, making the light emission amount of the electronic flash smaller than that in the normal image capturing mode.

Leaving selection of the normal image capturing mode or macro image capturing mode to the user in the image capturing apparatus having the macro image capturing function lowers the convenience for the user (usability). Additionally, the user may forget to select the macro image capturing mode when the object is nearby.

Japanese Patent Laid-Open No. 2007-225713 has proposed a technique of automatically selecting the normal image capturing mode or macro image capturing mode based on an AF evaluation value (focus signal) representing the sharpness (contrast) of an image signal or the position of the focusing lens (focus lens). In Japanese Patent Laid-Open No. 2007-225713, it is determined in the normal image capturing mode that the object exists in the macro region (closest side) when the AF evaluation value obtained by moving the focusing lens in the optical axis direction is smaller than a predetermined reference value, or when the AF evaluation value has its peak on the side where an object in the short range is brought into focus.

However, if it is determined based on only the AF evaluation value or the position of the focusing lens whether the object exists in the macro region, as in Japanese Patent Laid-Open No. 2007-225713, a determination error may occur.

More specifically, if the AF evaluation value changes due to an abrupt change in brightness, for example, if the AF evaluation value increases when the driving direction of the focusing lens is the closest direction, the object is erroneously determined to be on the closest side even if it is not present there. When capturing a low-contrast object or an object in a dark place, the AF evaluation value moderately changes. For this reason, the AF evaluation value larger than the predetermined reference value cannot be obtained, and a determination error occurs. Note that the determination error can be prevented by determining based on the position of the focusing lens in the in-focus state (that is, the stop position of the focusing lens) whether the object exists in the macro region. In this case, however, the determination needs to wait for the stop of the focusing lens. Hence, determining whether the object exists in the macro region takes a long time.

SUMMARY OF THE INVENTION

The present invention provides a new technique of improving the accuracy of determining whether an object exists in the macro region and shortening the time required for the determination.

According to one aspect of the present invention, there is provided an image capturing apparatus including an image capturing unit configured to photoelectrically convert an image of an object formed by an image capturing optical system to generate an image signal, a generation unit configured to generate, from the image signal generated by the image capturing unit, an evaluation value representing an in-focus state of the image capturing optical system, an adjusting unit configured to, using first driving that drives a focusing lens included in the image capturing optical system along an optical axis direction in a first driving amount and second driving that drives the focusing lens along the optical axis direction in a second driving amount larger than the first driving amount, perform focus detection by adjusting relative positions of the image capturing unit and the focusing lens so as to maximize the evaluation value generated by the generation unit, and a determination unit configured to determine, during the focus detection by the adjusting unit, whether the object exists in a specific region defined in advance in the image capturing optical system in a range shorter than a predetermined distance, wherein the determination unit determines that the object exists in the specific region when the focusing lens is located in a region on a closest side of a threshold corresponding to the predetermined distance, the adjusting unit drives the focusing lens using the first driving, and the focusing lens has reciprocally passed through a single peak position of the evaluation value not less than a predetermined reference number of times.

Further aspects of the present invention will become apparent from the following description of exemplary embodiments with reference to the attached drawings.

BRIEF DESCRIPTION OF THE DRAWINGS

FIGS. 4A and 4B are timing charts showing the driving state of the focusing lens in microdriving.

FIG. 7 is a graph showing the relationship between the position of a magnification lens and the position of the focusing lens in the image capturing apparatus shown in FIG. 1.

FIG. 12 is a view showing an example of a macro region determination result displayed on the display unit of the image capturing apparatus shown in FIG. 1.

DESCRIPTION OF THE EMBODIMENTS

Figure 1:
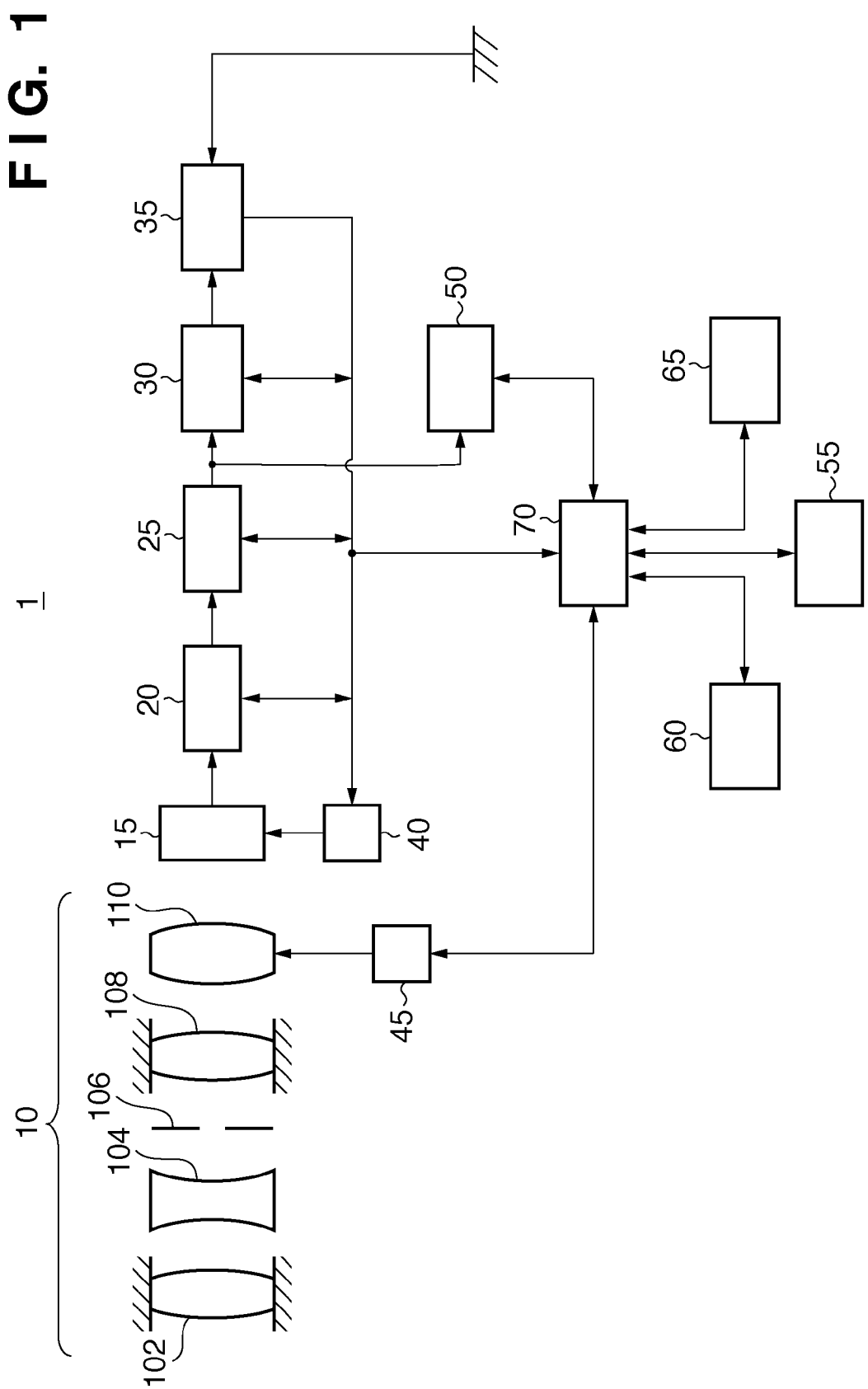
FIG. 1 is a schematic view showing the arrangement of an image capturing apparatus according to an embodiment of the present invention.

Preferred embodiments of the present invention will be described below with reference to the accompanying drawings. Note that the same reference numerals denote the same members throughout the drawings, and a repetitive description thereof will not be given.

FIG. 1 is a schematic view showing the arrangement of an image capturing apparatus 1 according to an embodiment of the present invention. The image capturing apparatus 1 is embodied as a digital camera having a macro image capturing function of allowing to select a normal image capturing mode or a macro image capturing mode as an image capturing mode for capturing an object.

The image capturing apparatus 1 includes a first fixed lens 102, a magnification lens 104 which moves in the optical axis direction to perform magnification, a stop 106, a second fixed lens 108, and a focusing lens (focus compensator lens) 110. Note that in this embodiment, the focusing lens 110 has a function of correcting focal plane movement upon magnification, and a focusing function. The first fixed lens 102, magnification lens 104, stop 106, second fixed lens 108, and focusing lens 110 form an image capturing optical system 10 configured to form an object image.

The image capturing apparatus 1 also includes an image sensor 15, a CDS/AGC/AD circuit unit 20, a FIFO memory 25, a signal processing unit 30, and a recording unit 35. The image sensor 15 is formed from, for example, a CCD sensor or a CMOS sensor to photoelectrically convert the object image formed by the image capturing optical system 10. The CDS/AGC/AD circuit unit 20 samples the output from the image sensor 15, adjusts its gain, and digitizes the signal. The FIFO memory 25 extracts, from the signal output from the CDS/AGC/AD circuit unit 20, only the signal in a region to be used by the signal processing unit 30 for the horizontal (H) direction, and adjusts the clock timing. The signal processing unit 30 performs various kinds of image processing for the signal output from the FIFO memory 25 to generate an image signal (video signal). The recording unit 35 records the image signal output from the signal processing unit 30 in a recording medium such as a magnetic tape, optical disk, or semiconductor memory.

The image capturing apparatus 1 additionally includes a driving pulse generation unit 40 which generates a driving pulse to drive the image sensor 15, and a lens driving unit 45 which drives the focusing lens 110 along the optical axis direction. The lens driving unit 45 is formed from an actuator such as a stepping motor, DC motor, oscillating motor, or voice coil motor.

The image capturing apparatus 1 includes a generation unit 50 which extracts a high-frequency component or a luminance difference component (the difference between the maximum value and the minimum value of the luminance level of the signal output from the FIFO memory 25) from the output signal of the FIFO memory 25, generates an AF evaluation value (focusing signal), and inputs it to a control unit 70. The AF evaluation value represents the sharpness (contrast) of the image generated based on the output signal of the image sensor 15. The sharpness changes depending on the in-focus state (focusing state) of the image capturing optical system 10. Hence, the AF evaluation value represents the in-focus state of the image capturing optical system 10.

The image capturing apparatus 1 also includes an operation unit 55, display unit 60, electronic flash unit 65, and control unit 70. The operation unit 55 includes, for example, various kinds of buttons configured to receive an operation (instruction) from the user (operator), and a touch panel provided on the display unit 60. In this embodiment, image capturing mode selection (that is, switching between the normal image capturing mode and the macro image capturing mode) and the like are input to the control unit 70 via the operation unit 55. The display unit 60 is formed from, for example, an LCD to display an image corresponding to the image signal output from the signal processing unit 30 or the state (for example, set state or image capturing state) of the image capturing apparatus 1. In this embodiment, the display unit 60 also performs display to inform the user of the presence of an object in the macro region of the image capturing optical system 10. When capturing an object in a dark place, the electronic flash unit 65 irradiates the object with light (that is, emits light).

The control unit 70 includes a CPU, a memory, and the like, and controls the overall operation of the image capturing apparatus 1. For example, the control unit 70 controls image display of the display unit 60 and the timing and amount of light emission of the electronic flash unit 65. The control unit 70 also adjusts the position of the focusing lens 110 via the lens driving unit 45 for focus detection (auto-focus control) so as to maximize the AF evaluation value generated by the generation unit 50. In this embodiment, the control unit 70 determines during focus detection whether the object exists in the macro region of the image capturing optical system 10 in a range shorter than a predetermined distance, as will be described later in detail. This determination will be referred to as macro region determination hereinafter.

Figure 2:
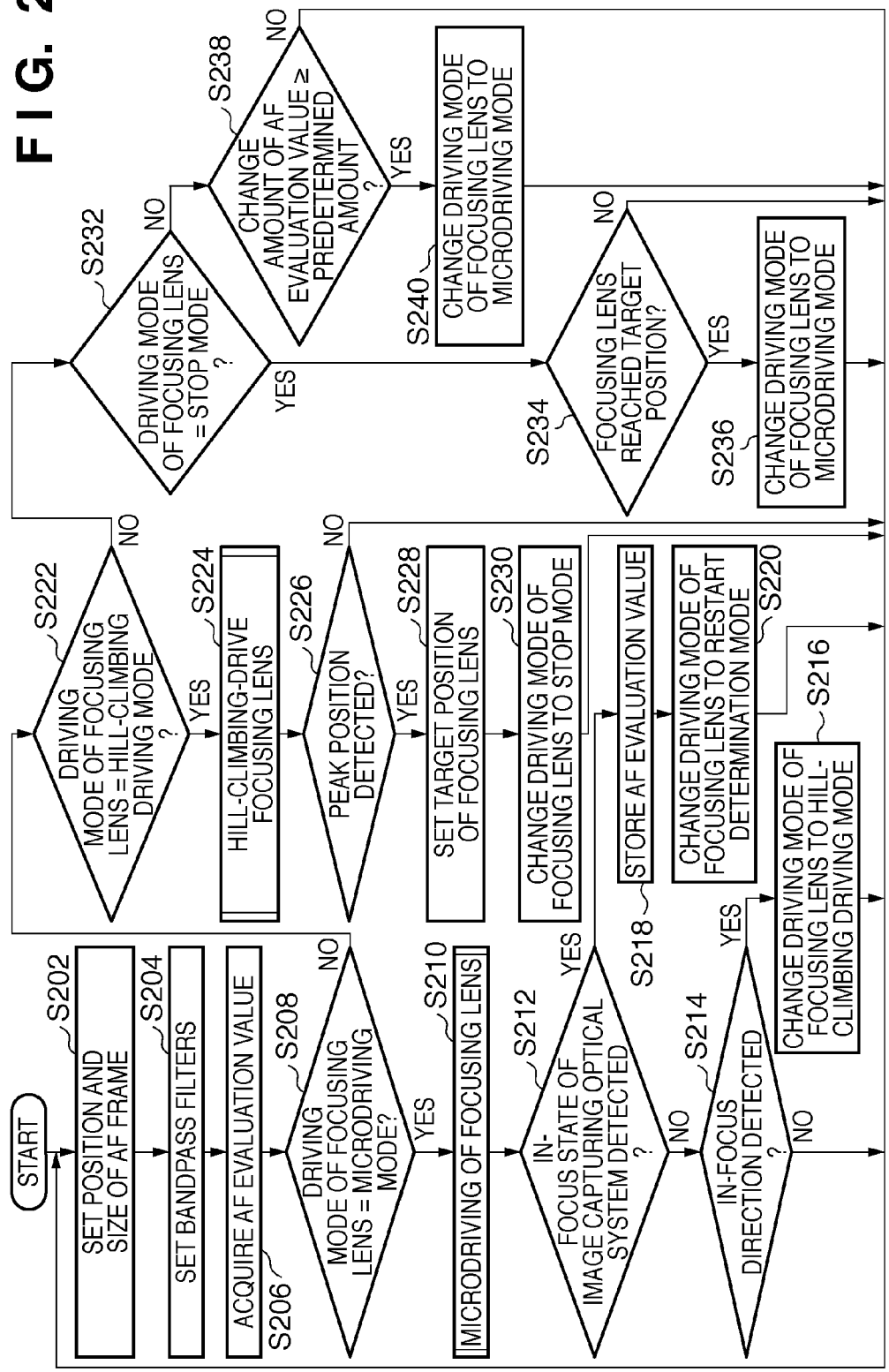
FIG. 2 is a flowchart for explaining auto-focus control of the image capturing apparatus shown in FIG. 1.

Auto-focus control of the image capturing apparatus 1 will be explained with reference to FIG. 2. Note that auto-focus control of the image capturing apparatus 1 is executed by causing the control unit 70 to generally control the units of the image capturing apparatus 1, as described above.

In step S202, the control unit 70 sets the position and size of the auto-focus (AF) frame in the generation unit 50. The AF frame represents the region to be used for AF evaluation value generation in the output signal of the FIFO memory 25. Hence, when the position and size of the AF frame are set, the AF evaluation value is generated from the signal included in the AF frame out of the output signal of the FIFO memory 25.

In step S204, the control unit 70 sets a plurality of bandpass filters having different extraction characteristics in the generation unit 50. Note that the extraction characteristic is the frequency characteristic of a bandpass filter. Setting a bandpass filter means setting (changing) the filter coefficient of the bandpass filter of the generation unit 50.

In step S206, the control unit 70 acquires AF evaluation values generated by the generation unit 50. Note that the AF evaluation values acquired in step S206 are added at a predetermined ratio and used in processing later.

In step S208, the control unit 70 determines whether the current driving mode of the focusing lens 110 in auto-focus control is the microdriving mode (first driving). In the microdriving mode, the focusing lens 110 is microdriven along the optical axis direction (driven in a first driving amount). If the driving mode of the focusing lens 110 is the microdriving mode, the process advances to step S210. On the other hand, if the driving mode of the focusing lens 110 is not the microdriving mode, the process advances to step S222.

In step S210, the control unit 70 microdrives the focusing lens 110 within the focal depth via the lens driving unit 45, thereby adjusting the position of the focusing lens 110 so as to maximize the AF evaluation value. At this time, the control unit 70 detects whether the image capturing optical system 10 is in the in-focus state, and also detects on which side the in-focus position exists, the closest side or the infinity side (that is, detects the in-focus direction).

In step S212, the control unit 70 determines whether the in-focus state of the image capturing optical system 10 is detected upon microdriving of the focusing lens 110 (S210). If the in-focus state of the image capturing optical system 10 is not detected, the process advances to step S214. If the in-focus state of the image capturing optical system 10 is detected, the process advances to step S218.

In step S214, the control unit 70 determines whether the in-focus direction is detected upon microdriving of the focusing lens 110 (S210). If the in-focus direction is not detected, the process returns to step S202 while maintaining the microdriving mode as the driving mode of the focusing lens 110. If the in-focus direction is detected, the process advances to step S216.

In step S216, the control unit 70 changes the driving mode of the focusing lens 110 to the hill-climbing driving mode (second driving). In the hill-climbing driving mode, the focusing lens 110 is driven along the optical axis direction in a driving amount larger than that in the microdriving mode (a second driving amount larger than the first driving amount).

In the S218, the control unit 70 stores, in the memory, the AF evaluation value in the in-focus state of the image capturing optical system 10. In step S220, the control unit 70 changes the driving mode of the focusing lens 110 to the restart determination mode.

In step S222, the control unit 70 determines whether the current driving mode of the focusing lens 110 in auto-focus control is the hill-climbing driving mode. If the driving mode of the focusing lens 110 is the hill-climbing driving mode, the process advances to step S224. On the other hand, if the driving mode of the focusing lens 110 is not the hill-climbing driving mode, the process advances to step S232.

In step S224, the control unit 70 drives the focusing lens 110 via the lens driving unit 45, thereby adjusting the position of the focusing lens 110 so as to maximize the AF evaluation value. More specifically, the focusing lens 110 is driven in the direction to make the AF evaluation value larger, and the peak position of the AF evaluation value is detected.

In step S226, the control unit 70 determines whether the peak position of the AF evaluation value is detected upon hill-climbing driving of the focusing lens 110 (S224). If the peak position of the AF evaluation value is not detected, the process returns to step S202 while maintaining the hill-climbing driving mode as the driving mode of the focusing lens 110. If the peak position of the AF evaluation value is detected, the process advances to step S228.

In step S228, the control unit 70 sets the position of the focusing lens 110 corresponding to the peak position of the AF evaluation value as the target position of the focusing lens 110. In step S230, the control unit 70 changes the driving mode of the focusing lens 110 to the stop mode. In the stop mode, the focusing lens 110 is driven toward the target position set in step S228.

In step S232, the control unit 70 determines whether the current driving mode of the focusing lens 110 in auto-focus control is the stop mode. If the driving mode of the focusing lens 110 is the stop mode, the process advances to step S234. On the other hand, if the driving mode of the focusing lens 110 is not the stop mode (if the driving mode is the restart determination mode), the process advances to step S238.

In step S234, the control unit 70 determines whether the focusing lens 110 has arrived (rests) at the target position set in step S228. If the focusing lens 110 has not arrived at the target position set in step S228, the process returns to step S202 while maintaining the stop mode as the driving mode of the focusing lens 110. If the focusing lens 110 has arrived at the target position set in step S228, the process advances to step S236.

In step S236, the control unit 70 changes the driving mode of the focusing lens 110 to the microdriving mode.

In step S238, the control unit 70 compares the AF evaluation value stored in the memory in step S218 with the current AF evaluation value, and determines whether the change amount (the difference between the AF evaluation value stored in the memory in step S218 and the current AF evaluation value) is equal to or larger than a predetermined amount. If the change amount of the AF evaluation value is equal to or larger than the predetermined amount (in other words, the focusing lens 110 is out of the in-focus state), the process advances to step S240. On the other hand, if the change amount of the AF evaluation value is not equal to or larger than the predetermined amount (in other words, the focusing lens 110 is almost at the in-focus position and maintains the in-focus state), the process returns to step S202. In step S240, the control unit 70 changes the driving mode of the focusing lens 110 to the microdriving mode.

Figure 3:
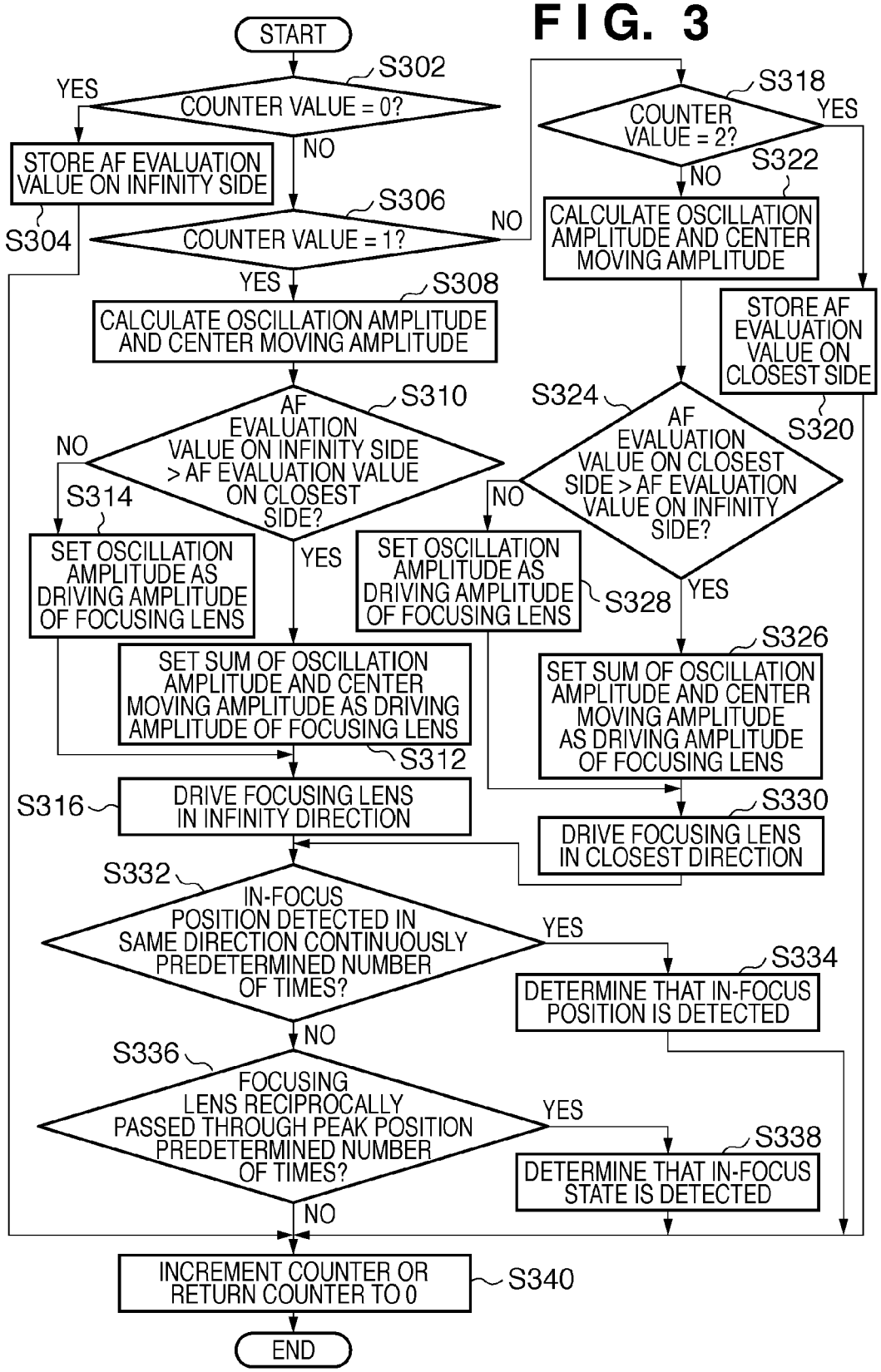
FIG. 3 is a flowchart for explaining microdriving of a focusing lens in step S210 of FIG. 2 in detail.

Microdriving of the focusing lens 110 in step S210 will be described in detail with reference to FIG. 3. In step S302, the control unit 70 confirms whether the current counter value is 0. If the current counter value is 0, the process advances to step S304. On the other hand, if the current counter value is not 0, the process advances to step S306.

In step S304, the control unit 70 stores the AF evaluation value in the memory as processing when the focusing lens 110 is located on the closest side. The AF evaluation value stored in the memory in step S304 is the AF evaluation value generated from the image signal corresponding to charges accumulated in the image sensor 15 when the focusing lens 110 is located on the infinity side.

In step S306, the control unit 70 confirms whether the current counter value is 1. If the current counter value is 1, the process advances to step S308 to drive the focusing lens 110 to the infinity side. On the other hand, if the current counter value is not 1, the process advances to step S318.

In step S308, the control unit 70 calculates the oscillation amplitude and the center moving amplitude. Note that these amplitudes are generally set within the focal depth.

In step S310, the control unit 70 determines whether the AF evaluation value stored in the memory in step S304 (the AF evaluation value on the infinity side) is larger than the AF evaluation value stored in the memory in step S320 (the AF evaluation value on the closest side). If the AF evaluation value on the infinity side is larger than the AF evaluation value on the closest side, the process advances to step S312. If the AF evaluation value on the infinity side is not larger than the AF evaluation value on the closest side, the process advances to step S314.

In step S312, the control unit 70 sets the sum of the oscillation amplitude and the center moving amplitude calculated in step S308 as the driving amplitude of the focusing lens 110.

In step S314, the control unit 70 sets the oscillation amplitude calculated in step S308 as the driving amplitude of the focusing lens 110.

In step S316, the control unit 70 drives the focusing lens 110 in the infinity direction (infinity side) via the lens driving unit 45 in the driving amplitude set in step S312 or S314.

In step S318, the control unit 70 confirms whether the current counter value is 2. If the current counter value is 2, the process advances to step S320. On the other hand, if the current counter value is not 2, the process advances to step S322.

In step S320, the control unit 70 stores the AF evaluation value in the memory as processing when the focusing lens 110 is located on the infinity side. The AF evaluation value stored in the memory in step S320 is the AF evaluation value generated from the image signal corresponding to charges accumulated in the image sensor 15 when the focusing lens 110 is located on the closest side.

In step S322, the control unit 70 calculates the oscillation amplitude and the center moving amplitude. As described above, these amplitudes are generally set within the focal depth.

In step S324, the control unit 70 determines whether the AF evaluation value stored in the memory in step S320 (the AF evaluation value on the closest side) is larger than the AF evaluation value stored in the memory in step S304 (the AF evaluation value on the infinity side). If the AF evaluation value on the closest side is larger than the AF evaluation value on the infinity side, the process advances to step S326. If the AF evaluation value on the closest side is not larger than the AF evaluation value on the infinity side, the process advances to step S328.

In step S326, the control unit 70 sets the sum of the oscillation amplitude and the center moving amplitude calculated in step S322 as the driving amplitude of the focusing lens 110.

In step S328, the control unit 70 sets the oscillation amplitude calculated in step S322 as the driving amplitude of the focusing lens 110.

In step S330, the control unit 70 drives the focusing lens 110 in the closest direction (closest side) via the lens driving unit 45 in the driving amplitude set in step S326 or S328.

In step S332, the control unit 70 determines whether the in-focus position is detected in the same direction continuously a predetermined number of times upon driving of the focusing lens 110 in step S316 or S330. If the in-focus position is detected in the same direction continuously the predetermined number of times, the process advances to step S334, and the control unit 70 determines that the in-focus direction of the image capturing optical system 10 is detected. On the other hand, if the in-focus position is not detected in the same direction continuously the predetermined number of times, the process advances to step S336.

In step S336, the control unit 70 determines whether the focusing lens 110 has reciprocally passed through the peak position of the AF evaluation value a predetermined number of times. If the focusing lens 110 has reciprocally passed through the peak position of the AF evaluation value the predetermined number of times, the process advances to step S338, and the control unit 70 determines that the in-focus state of the image capturing optical system 10 is detected. More specifically, the peak position of the AF evaluation value through which the focusing lens 110 has reciprocally passed the predetermined number of times is determined as the in-focus position, and driving of the focusing lens 110 is stopped. On the other hand, if the focusing lens 110 has not reciprocally passed through the peak position of the AF evaluation value the predetermined number of times, the process advances to step S340.

In step S340, if the current counter value is 0 or 1, the control unit 70 increments the counter value by 1. If the current counter value is 3, the control unit 70 returns the counter value to 0.

FIGS. 4A and 4B are timing charts showing the driving state of the focusing lens 110 in microdriving. FIG. 4A shows the vertical synchronizing signal of the image signal. FIG. 4B shows the relationship between the time and the position of the focusing lens 110. Referring to FIGS. 4A and 4B, at time $T_A$, the control unit 70 acquires an AF evaluation value $EV_A$ generated from an image signal corresponding to charges accumulated in the image sensor 15 at time of label $L_A$. Similarly, at time $T_B$, the control unit 70 acquires an AF evaluation value $EV_B$ generated from an image signal corresponding to charges accumulated in the image sensor 15 at time of label $L_B$. At time $T_C$, the control unit 70 compares the AF evaluation value $EV_A$ with the AF evaluation value $EV_B$, and moves the center of oscillation only when the AF evaluation value $EV_B$ is larger. Note that the driving amount of the focusing lens 110 in microdriving is set based on the focal depth to an amount hardly recognizable by the user in the captured image.

Figure 5:
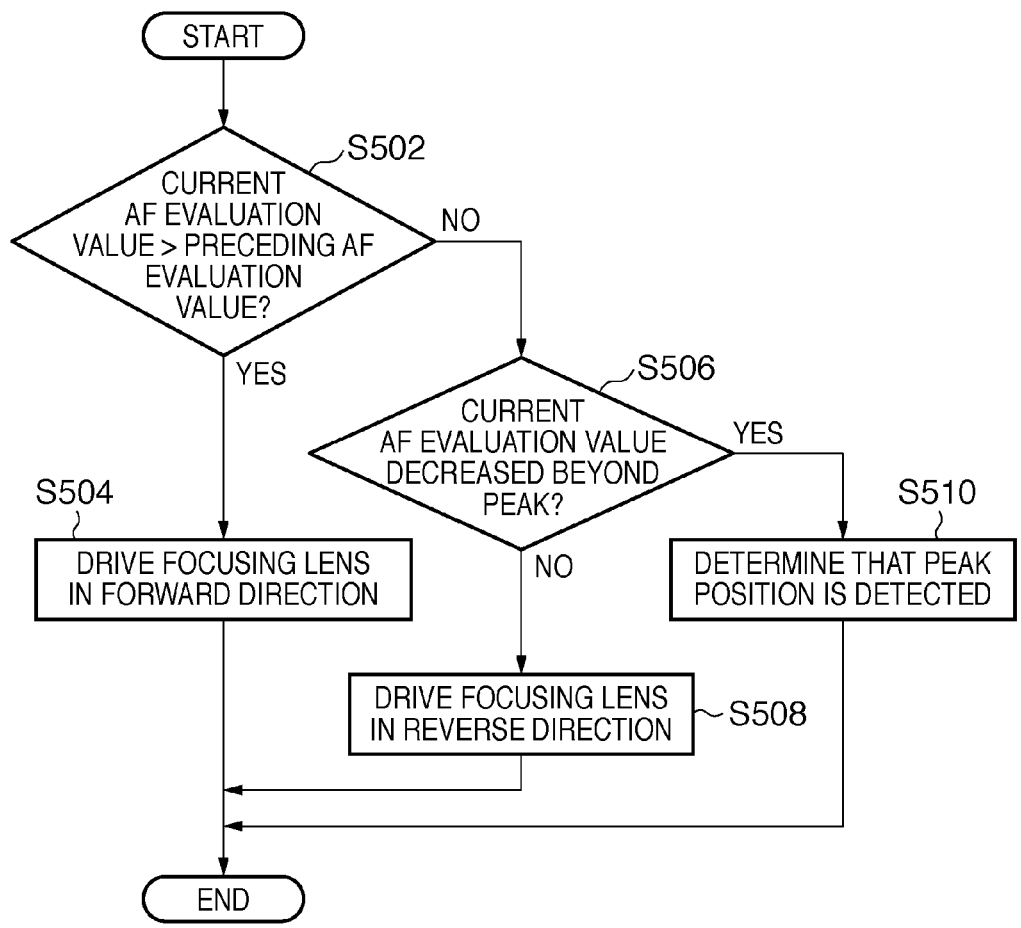
FIG. 5 is a flowchart for explaining hill-climbing driving of the focusing lens in step S224 of FIG. 2 in detail.

Hill-climbing driving of the focusing lens 110 in step S224 will be described in detail with reference to FIG. 5. In step S502, the control unit 70 determines whether the current AF evaluation value is larger than the preceding AF evaluation value. If the current AF evaluation value is larger than the preceding AF evaluation value, the process advances to step S504. If the current AF evaluation value is not larger than the preceding AF evaluation value, the process advances to step S506.

In step S504, the control unit 70 drives the focusing lens 110 in the forward direction (that is, the same direction as the direction in which the focusing lens 110 has been driven so far) via the lens driving unit 45.

In step S506, the control unit 70 determines whether the current AF evaluation value has decreased beyond the peak (maximum value). If the current AF evaluation value has not decreased beyond the peak, the process advances to step S508. If the current AF evaluation value has decreased beyond the peak, the process advances to step S510.

In step S508, the control unit 70 drives the focusing lens 110 in the reverse direction (that is, the direction reverse to the direction in which the focusing lens 110 has been driven so far) via the lens driving unit 45. In step S510, the control unit 70 determines that the peak position of the AF evaluation value is detected.

Figure 6:
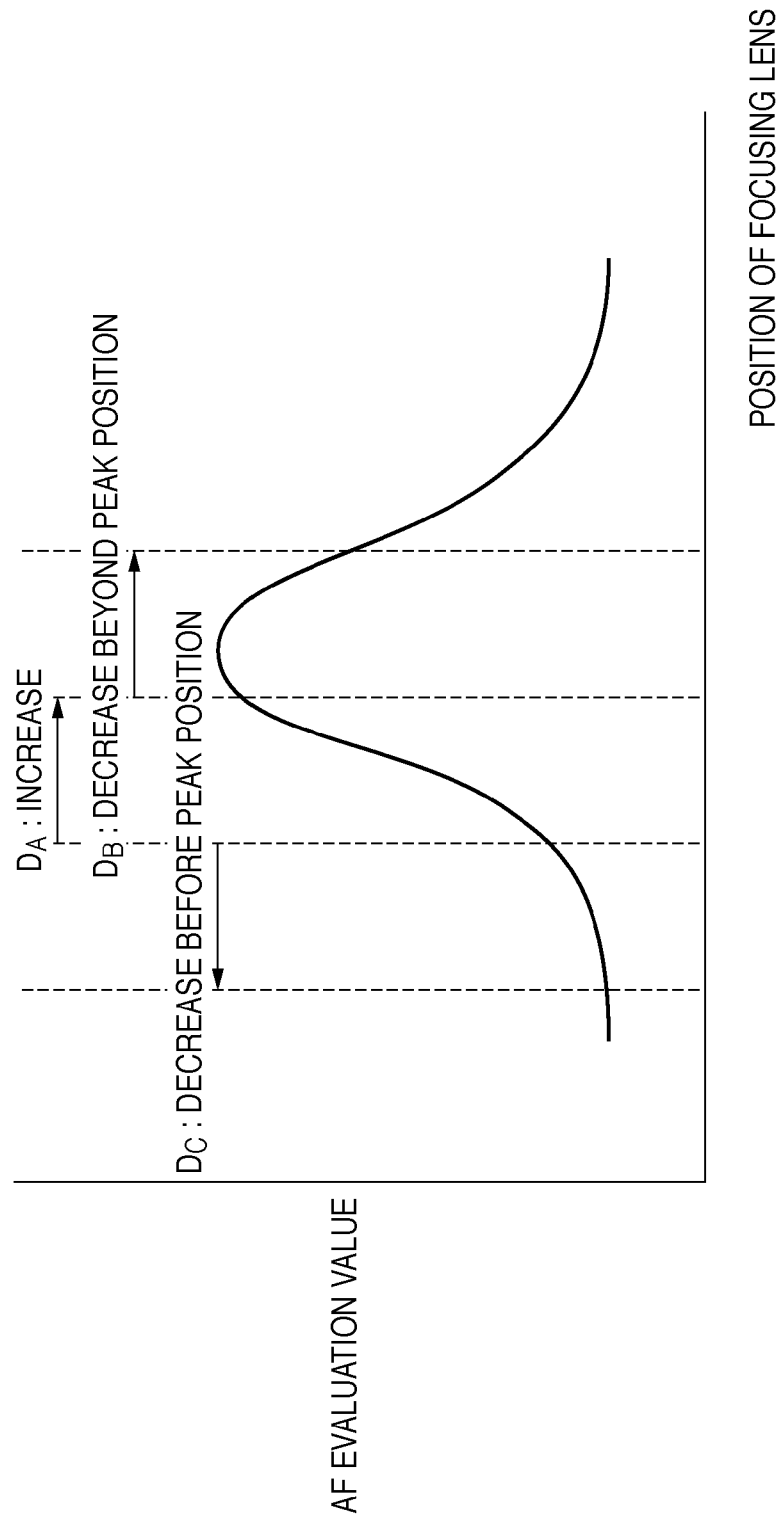
FIG. 6 is a graph showing the driving state of the focusing lens in hill-climbing driving.

FIG. 6 is a graph showing the driving state of the focusing lens 110 in hill-climbing driving. Referring to FIG. 6, when driving the focusing lens 110 in a range $D_A$ (the driving direction is the direction of the arrow), hill-climbing driving in the forward direction is maintained because the AF evaluation value increases. When driving the focusing lens 110 in a range $D_B$ (the driving direction is the direction of the arrow), the AF evaluation value decreases beyond the peak position. In this case, the control unit 70 determines that the peak position (in-focus position) is detected. The control unit 70 returns the focusing lens 110 up to the peak position, and then changes the driving mode of the focusing lens 110 to the microdriving mode. On the other hand, when driving the focusing lens 110 in a range $D_C$ (the driving direction is the direction of the arrow), the AF evaluation value decreases before the peak position. In this case, the control unit 70 reverses the driving direction of the focusing lens 110 so as to maintain hill-climbing driving in the reverse direction.

As described above, in auto-focus control of the image capturing apparatus 1, the position of the focusing lens 110 is adjusted to maximize the AF evaluation value using microdriving and hill-climbing driving, and the in-focus state of the image capturing optical system 10 is maintained.

Macro region determination of the image capturing apparatus 1 will be explained below. Note that the control unit 70 performs the macro region determination, as described above.

Basic macro region determination will be described first. FIG. 7 is a graph showing the relationship between the position of the magnification lens 104 and the position of the focusing lens 110. Referring to FIG. 7, depending on the position of the magnification lens 104, the driving range of the focusing lens 110 changes, and the sensitivity of the object distance (focal length) to the driving amount of the focusing lens 110 also changes. Hence, it is necessary to set the macro region for the position of the focusing lens 110 in accordance with the position of the magnification lens 104.

Figure 8:
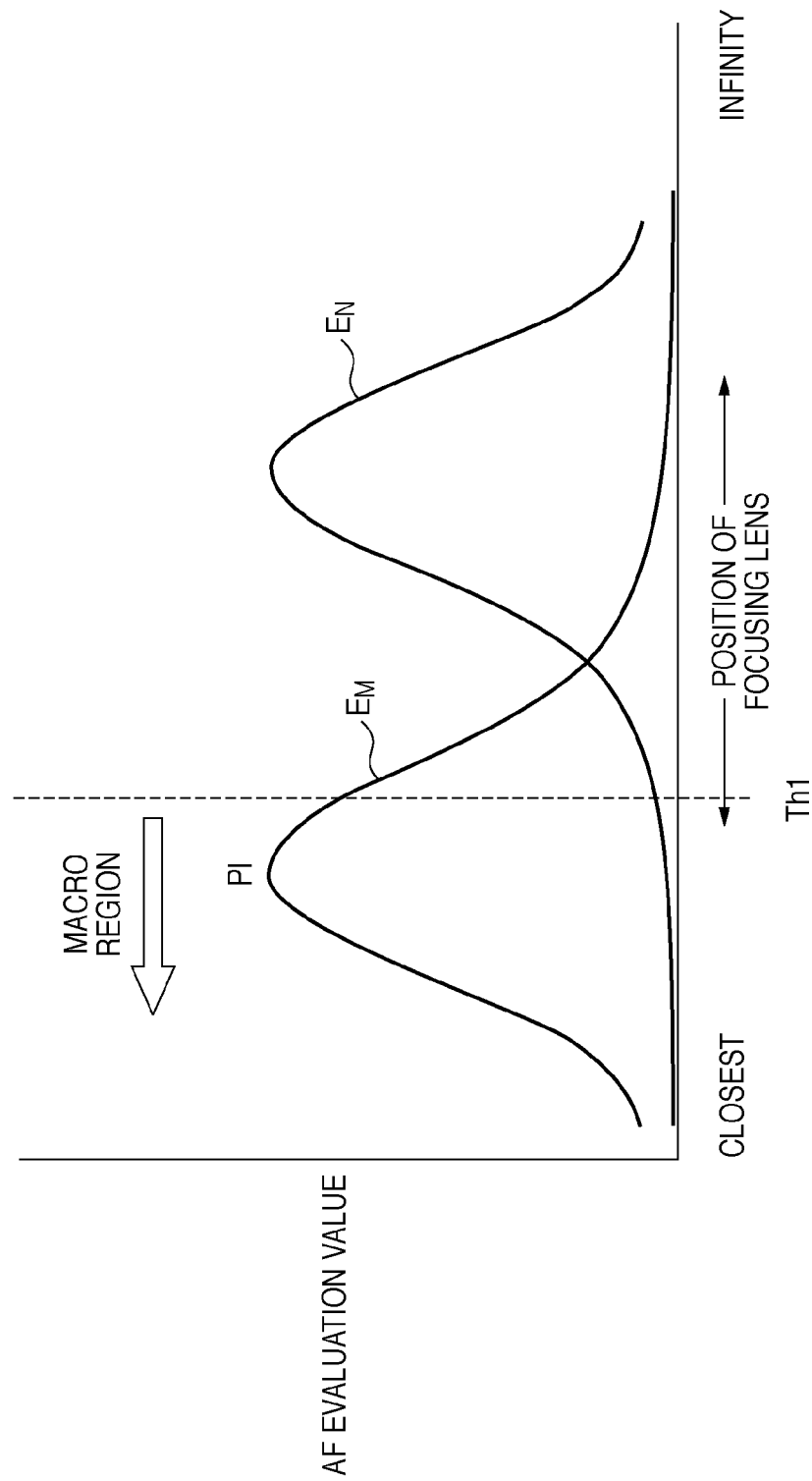
FIG. 8 is a graph showing the relationship between the position of the focusing lens and the AF evaluation value in the image capturing apparatus shown in FIG. 1.

FIG. 8 is a graph showing the relationship between the position of the focusing lens 110 and the AF evaluation value. FIG. 8 schematically illustrates a change in the AF evaluation value when the focusing lens 110 is driven from the closest side to the infinity side while setting the magnification lens 104 at a certain position.

The first condition of macro region determination is whether the focusing lens 110 is located in the macro region. In FIG. 8, the region on the closest side of a threshold Th1 is set as the macro region. Hence, the focusing lens 110 needs to be located on the closest side of the threshold Th1. Note that as a value corresponding to a predetermined distance up to the object, which defines the macro region of the image capturing optical system 10, is set as the threshold Th1.

The second condition is whether the peak position of the AF evaluation value is located on the closest side of the threshold Th1. The peak position of the AF evaluation value is a position where the object contrast in the image is maximum. Hence, if the peak position of the AF evaluation value is located in the region on the closest side of the threshold Th1, the object exists in the macro region. The peak position of the AF evaluation value is thus detected, thereby performing macro region determination.

For example, referring to FIG. 8, a peak position P1 of an AF evaluation value $E_M$ is present in the region on the closest side of the threshold Th1. This means that the object exists in the macro region (that is, an object in the macro region is captured). On the other hand, the peak position of an AF evaluation value $E_N$ is present in the region on the infinity side of the threshold Th1. This means that the object does not exist in the macro region (that is, an object outside the macro region is captured).

However, as described above, if macro region determination is performed based on only the AF evaluation value or the position of the focusing lens 110, a determination error occurs at high possibility. In FIG. 8, the AF evaluation value is generated by driving the focusing lens 110 from the infinity side to the closest side. However, when capturing a moving image, the focusing lens 110 cannot be driven from the infinity side to the closest side because the image blurs. Actually, the peak position of the AF evaluation value is specified in auto-focus control as shown in FIG. 2.

In this embodiment, macro region determination is performed in consideration of the driving state of the focusing lens 110. As described above, the driving states of the focusing lens 110 are roughly classified into microdriving and hill-climbing driving. The focusing lens 110 is microdriven or hill-climbing-driven in accordance with the change in the AF evaluation value.

Figure 9:
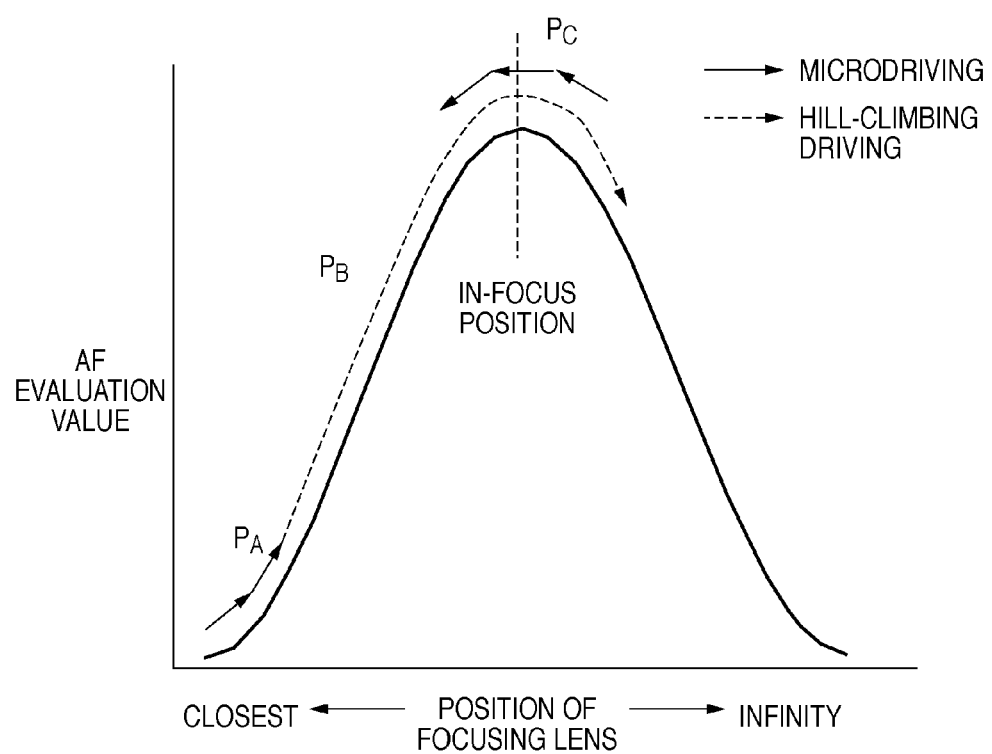
FIG. 9 is a graph showing the relationship between the change in the AF evaluation value and the driving state of the focusing lens.

FIG. 9 is a graph showing the relationship between the change in the AF evaluation value and the driving state of the focusing lens 110. For example, the focusing lens 110 located on the closest side is microdriven near a position $P_A$, thereby detecting the direction (in-focus direction) in which the AF evaluation value increases. After detecting the direction in which the AF evaluation value increases, the focusing lens 110 is hill-climbing-driven near a position $P_B$, thereby detecting the peak position of the AF evaluation value. At a position where the AF evaluation value has slightly decreased from a predetermined value, hill-climbing driving of the focusing lens 110 is stopped. In addition, the focusing lens 110 is microdriven at a position $P_C$ near the in-focus position, thereby detecting the in-focus position.

The driving range of the focusing lens 110 in hill-climbing driving is wider than that in microdriving, as shown in FIG. 9. Hence, during hill-climbing driving of the focusing lens 110, it is very difficult to specify its position for macro region determination, resulting in a determination error. To prevent this, in this embodiment, determining in the macro region determination that the object exists in the macro region is validated only when the focusing lens 110 is microdriven.

Figure 10:
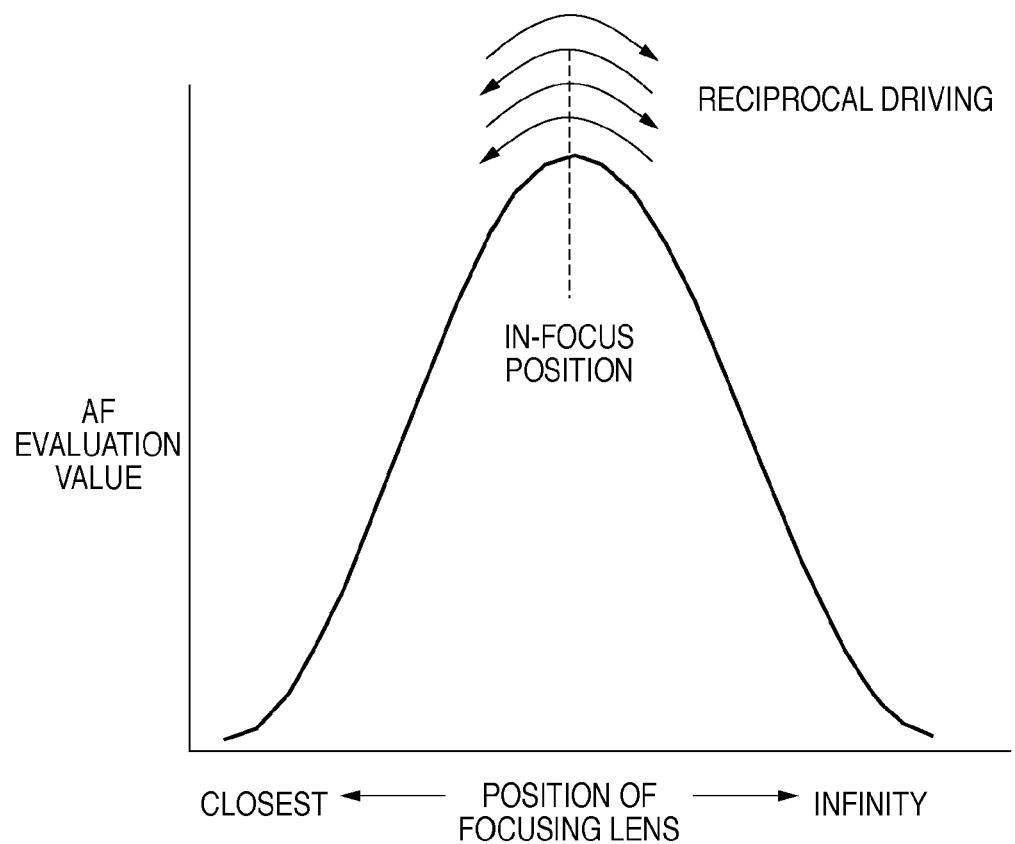
FIG. 10 is a graph showing the driving state of the focusing lens near the peak position (in-focus position) of the AF evaluation value.

FIG. 10 is a graph showing the driving state of the focusing lens 110 near the peak position (in-focus position) of the AF evaluation value. As described above, when the focusing lens 110 has reciprocally passed through the peak position of the AF evaluation value a predetermined number of times, the peak position is determined as the in-focus position, and driving of the focusing lens 110 is stopped. In this embodiment, the conditions of macro region determination include the number of times the focusing lens 110 has reciprocally passed through the peak position of the AF evaluation value. More specifically, whether the focusing lens 110 has reciprocally passed through the peak position of the AF evaluation value the reference number of times or more is included in the conditions of macro region determination.

For example, assume that the conditions of macro region determination do not include the number of times the focusing lens 110 has reciprocally passed through the peak position of the AF evaluation value. In this case, the object may erroneously be determined to be in the macro region when the focusing lens 110 is located in the macro region, and the mode changes to the microdriving mode as the AF evaluation value decreases due to some reason during the hill-climbing driving mode. To prevent such determination errors, after changing to the microdriving mode, the number K of times the focusing lens 110 has reciprocally passed through the signal peak position of the AF evaluation value is counted. When the number K of times reaches the reference number N of times, macro region determination is done upon determining that the focusing lens 110 is located near the in-focus position.

Note that the reference number N of times is set within the range from 0 (exclusive) to a predetermined number M of times (exclusive) the focusing lens reciprocally passes through the peak position of the AF evaluation value, which is necessary for in-focus position determination (0<N<M). Determining the in-focus position, stopping driving the focusing lens 110, and then performing macro region determination are not practical because the determination takes a long time. When macro region determination is executed by setting the reference number N of times to a value smaller than the predetermined number M of times, the time required for determination can shorten. However, it is necessary to do sufficient verifications and set the reference number N of times to such a value that causes no determination error. The control unit 70 may automatically set the reference number N of times. The control unit 70 thus functions as a count setting unit configured to set the reference number N of times. Alternatively, the user may set the reference number N of times via the operation unit 55.

Figure 11:
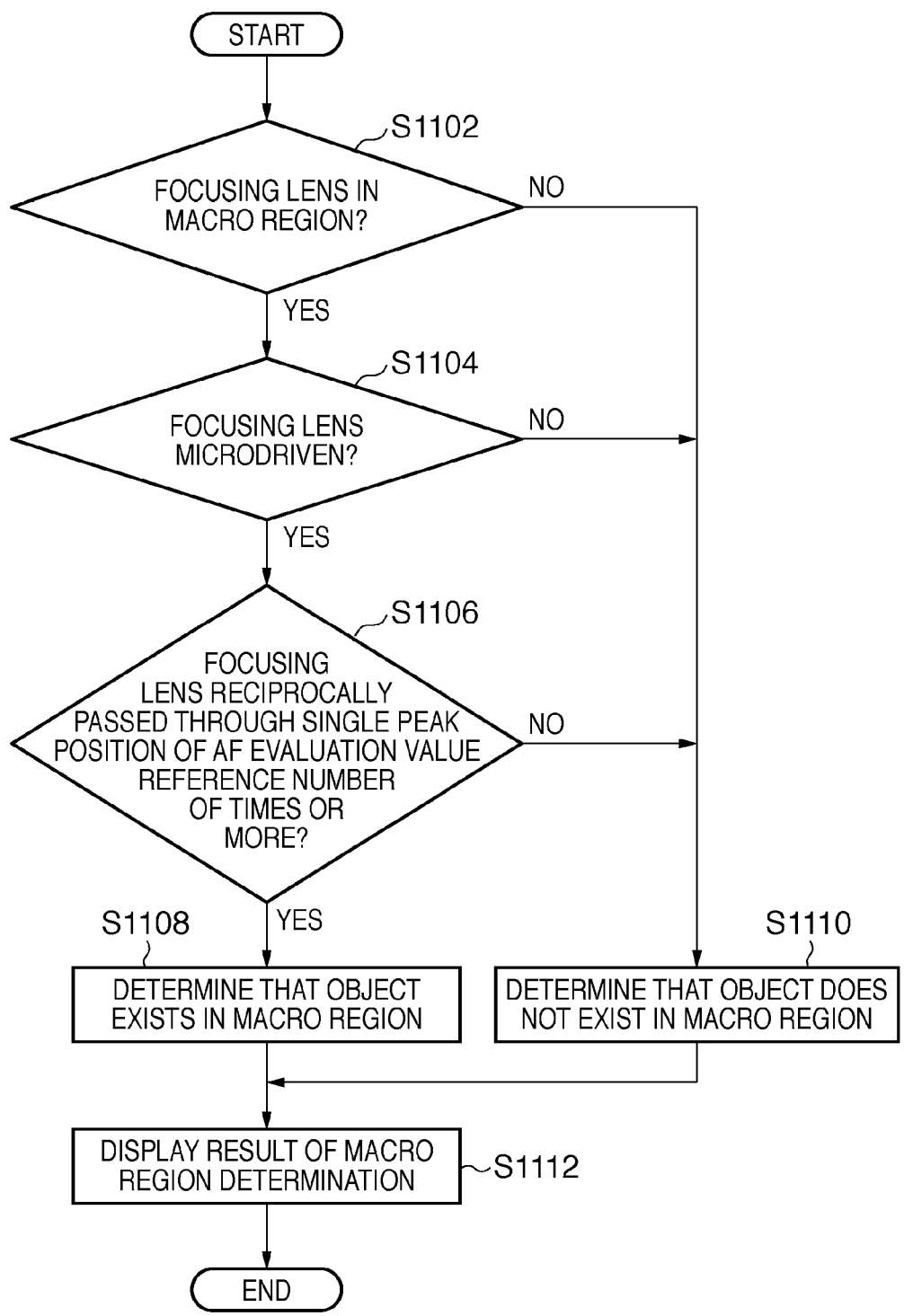
FIG. 11 is a flowchart for explaining macro region determination of the image capturing apparatus shown in FIG. 1.

Macro region determination of the image capturing apparatus 1 will be described in detail with reference to FIG. 11. In step S1102, the control unit 70 determines whether the focusing lens 110 is located in the macro region. If the focusing lens 110 is located in the macro region, the process advances to step S1104. If the focusing lens 110 is not located in the macro region, the process advances to step S1110.

In step S1104, the control unit 70 determines whether the focusing lens 110 is microdriven. If the focusing lens 110 is microdriven, the process advances to step S1106. If the focusing lens 110 is not microdriven, the process advances to step S1110.

In step S1106, the control unit 70 determines whether the focusing lens 110 has reciprocally passed through the single peak position of the AF evaluation value the reference number of times or more. If the focusing lens 110 has reciprocally passed through the single peak position of the AF evaluation value the reference number of times or more, the process advances to step S1108. If the focusing lens 110 has not reciprocally passed through the single peak position of the AF evaluation value the reference number of times or more, the process advances to step S1110.

In step S1108, the control unit 70 determines that the object exists in the macro region of the image capturing optical system 10. In step S1110, the control unit 70 determines that the object does not exist in the macro region of the image capturing optical system 10.

In step S1112, the control unit 70 displays the result of macro region determination on the display unit 60. For example, as shown in FIG. 12, when capturing an object OT in the macro region, an icon IC for informing the user of it is displayed at part of the screen of the display unit 60. The display in FIG. 12 is merely an example, and it is necessary to only inform the user of the presence of the object in the macro region. If the object does not exist in the macro region, an icon or the like is similarly displayed to inform the user of it. Note that when the object does not exist in the macro region, it can be captured in the normal image capturing mode, and display to notify the user of it is not specifically needed.

The control unit 70 can also set the image capturing mode of the image capturing apparatus 1 to the normal image capturing mode or the macro image capturing mode in accordance with the result of macro region determination. The control unit 70 thus functions as a mode setting unit configured to set the image capturing mode. More specifically, upon determining that the object does not exist in the macro region, the control unit 70 sets the normal image capturing mode. Upon determining that the object exists in the macro region, the control unit 70 sets the macro image capturing mode. Control unique to the macro image capturing mode is thus performed.

For example, the light emission amount of the electronic flash unit 65 is set based on the ambient darkness so as to appropriately capture an object such as a person. Since the light emission amount of the electronic flash unit 65 is too large for an object in the macro region, highlight-detail loss or the like occurs. To prevent this, if it is determined that the object exists in the macro region, the macro image capturing mode is set, and the light emission amount is made smaller than that in the normal state (normal image capturing mode). This makes it possible to appropriately capture the object in the macro region without causing highlight-detail loss even when the object exists in the macro region.

As described above, in the image capturing apparatus 1, the conditions of macro region determination include the driving state of the focusing lens 110 and the number of times the focusing lens 110 has reciprocally passed through the peak position of the AF evaluation value. When the focusing lens 110 is located in the macro region, the focusing lens 110 is microdriven, and the focusing lens 110 has reciprocally passed through the single peak position of the AF evaluation value the reference number of times or more, it is determined that the object exists in the macro region. If the focusing lens 110 is not located in the macro region, the focusing lens 110 is hill-climbing-driven, or the focusing lens 110 has not reciprocally passed through the single peak position of the AF evaluation value the reference number of times or more, it is determined that the object does not exist in the macro region. The image capturing apparatus 1 thus improves the accuracy of macro region determination and shortens the time required for determination.

Figure 13:
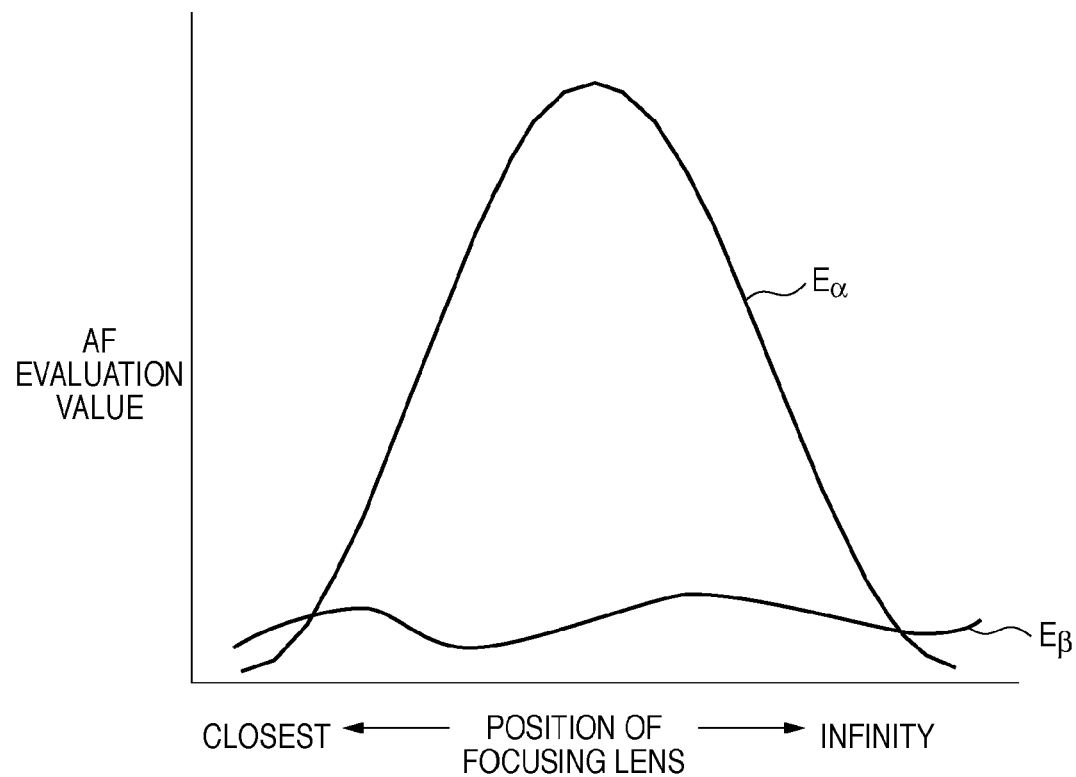
FIG. 13 is a graph showing examples of an AF evaluation value generated when capturing a normal object and that generated when capturing a low-contrast object or an object in a dark place.

Note that when capturing a low-contrast object or an object in a dark place, the generated AF evaluation value has no clear peak and moderately changes as a whole (the difference between the maximum value and the minimum value is small), as compared to an AF evaluation value obtained when capturing a normal object. FIG. 13 is a graph showing examples of an AF evaluation value $E_\alpha$ generated when capturing a normal object and an AF evaluation value $E_\beta$ generated when capturing a low-contrast object or an object in a dark place. The AF evaluation value $E_\beta$ has no steep peak. Even if the peak position (in-focus position) can be detected, it is not necessarily correct, leading to poorer macro region determination accuracy.

Figure 14:
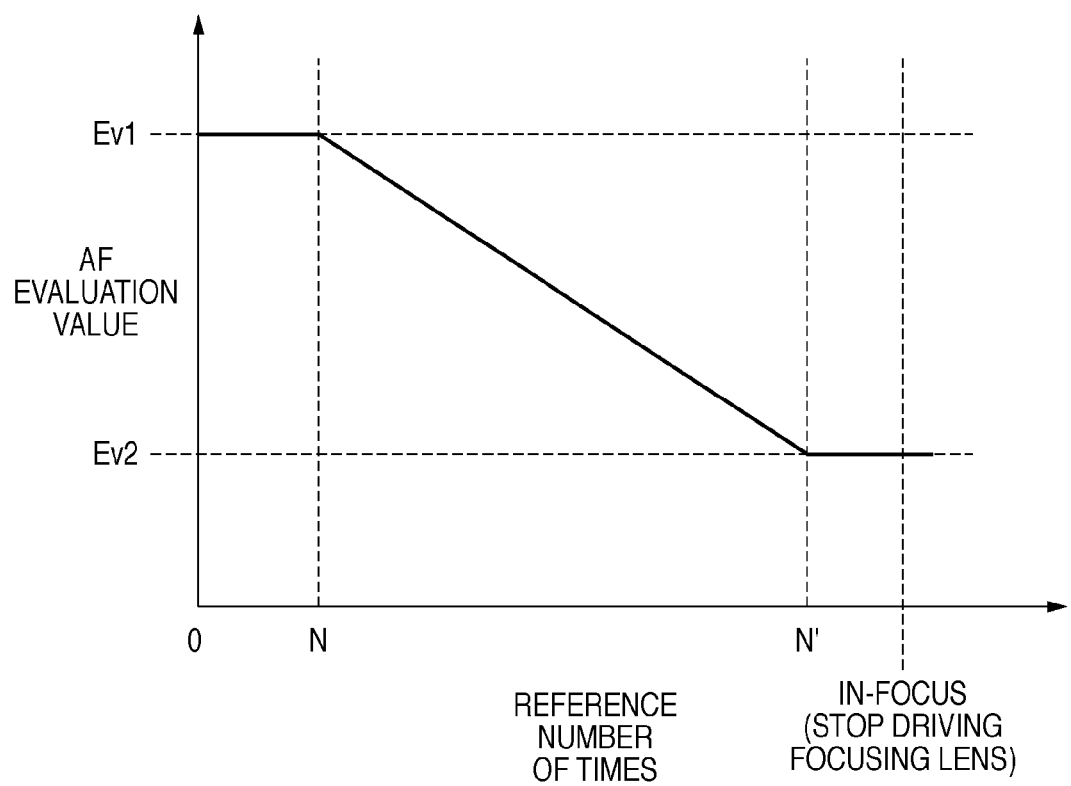
FIG. 14 is a graph showing the relationship between the AF evaluation value and the reference number of times that is one of macro region determination conditions.

In this embodiment, when capturing a low-contrast object or an object in a dark place, the condition concerning the number of times the focusing lens 110 has reciprocally passed through the peak position of the AF evaluation value, that is, the above-described reference number of times is changed. Changing the reference number of times will be described in detail with reference to FIG. 14. As shown in FIG. 14, let Ev1 be the difference between the maximum value and the minimum value of the AF evaluation value generated when capturing a normal object, and Ev2 be the difference between the maximum value and the minimum value of the AF evaluation value generated when capturing a low-contrast object or an object in a dark place. In this case, the control unit 70 sets N as the reference number of times for the AF evaluation value having the difference Ev1 between the maximum value and the minimum value, and N' (N<N') as the reference number of times for the AF evaluation value having the difference Ev2 between the maximum value and the minimum value. That is, the reference number of times is set to be larger as the difference between the maximum value and the minimum value becomes smaller. This allows to prevent the decrease in the macro region determination accuracy even when capturing a low-contrast object or an object in a dark place.

Figure 15:
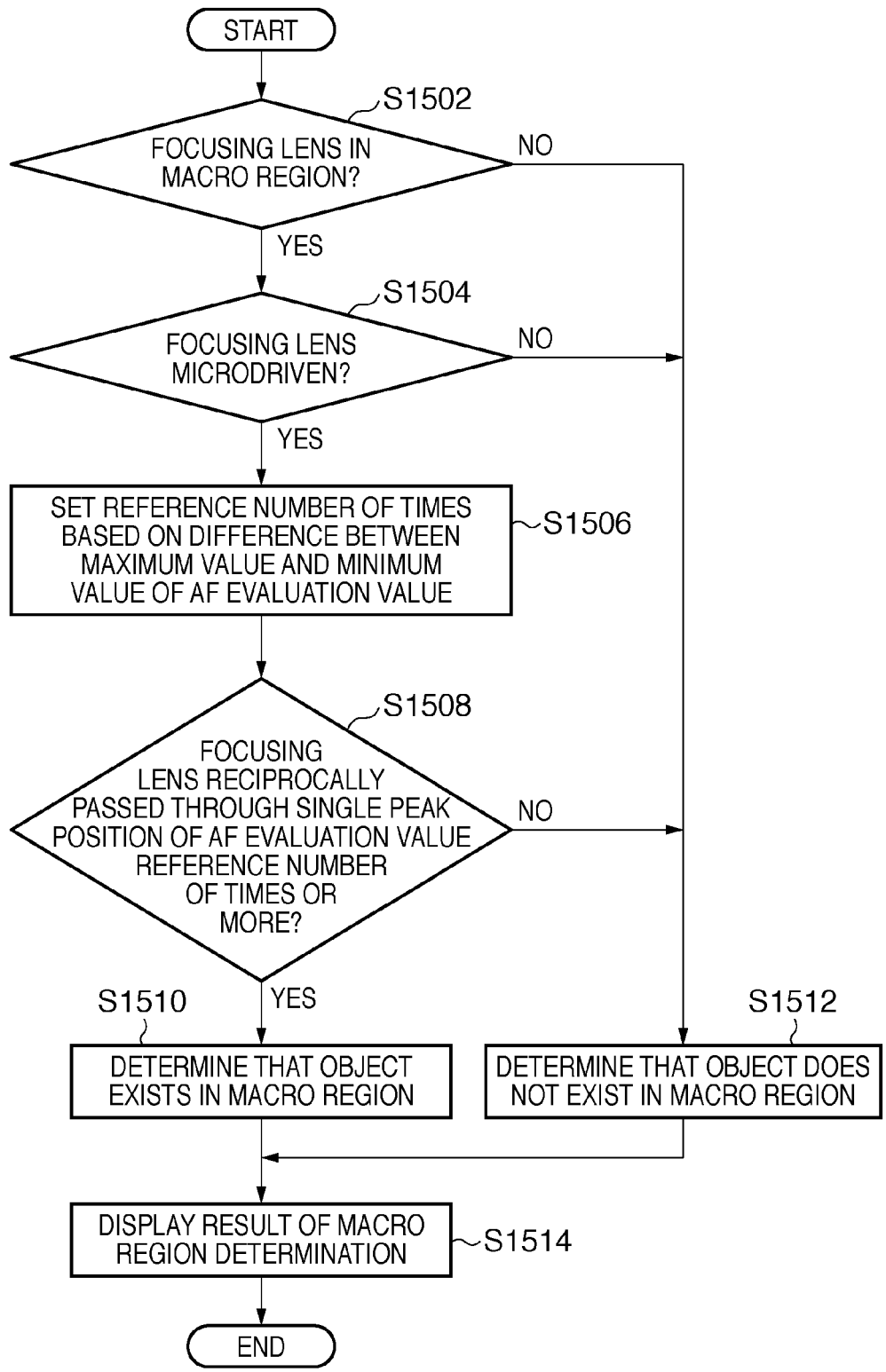
FIG. 15 is a flowchart for explaining macro region determination of the image capturing apparatus shown in FIG. 1.

Macro region determination of the image capturing apparatus 1 considering capturing a low-contrast object or an object in a dark place will be described in detail with reference to FIG. 15. Note that steps S1502 and S1504 of FIG. 15 are the same as steps S1102 and S1104 of FIG. 11, and a detailed description thereof will be omitted here.

In step S1506, the control unit 70 sets the reference number of times as a condition of macro region determination (the condition concerning the number of times the focusing lens 110 has reciprocally passed through the peak position of the AF evaluation value) in accordance with the difference between the maximum value and the minimum value of the AF evaluation value.

In step S1508, the control unit 70 determines whether the focusing lens 110 has reciprocally passed through the single peak position of the AF evaluation value the reference number of times set in step S1506 or more. If the focusing lens 110 has reciprocally passed through the single peak position of the AF evaluation value the reference number of times or more, the process advances to step S1510. On the other hand, if the focusing lens 110 has not reciprocally passed through the single peak position of the AF evaluation value the reference number of times or more, the process advances to step S1512.

In step S1510, the control unit 70 determines that the object exists in the macro region of the image capturing optical system 10. In step S1512, the control unit 70 determines that the object does not exist in the macro region of the image capturing optical system 10. In step S1514, the control unit 70 displays the result of macro region determination on the display unit 60, as in step S1112 of FIG. 11.

The reference number of times is thus changed in accordance with the difference between the maximum value and the minimum value of the AF evaluation value. When the contrast of the object is low, the reference number of times is increased to set a stricter macro region determination condition. This allows to prevent the decrease in the macro region determination accuracy even when the AF evaluation value has no clear peak, and a determination error readily occurs in macro region determination (when capturing a low-contrast object or an object in a dark place).

Note that in the above-described embodiment, the macro region determination condition is made stricter when the contrast of the object is low. However, the control unit may always determine that the object does not exist in the macro region when the contrast of the object is low. This enables to prevent a determination error.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2009-296388 filed on Dec. 25, 2009, which is hereby incorporated by reference herein in its entirety.

What is claimed is:

1. An image capturing apparatus comprising:
   an image capturing unit configured to photoelectrically convert an image of an object formed by an image capturing optical system to generate an image signal;
   a generation unit configured to generate, from the image signal generated by said image capturing unit, an evaluation value representing an in-focus state of the image capturing optical system;
   an adjusting unit configured to, using first driving that drives a focusing lens included in the image capturing optical system along an optical axis direction in a first driving amount and second driving that drives the focusing lens along the optical axis direction in a second driving amount larger than the first driving amount, perform focus detection by adjusting relative positions of said image capturing unit and the focusing lens so as to maximize the evaluation value generated by said generation unit; and
   a determination unit configured to determine, during the focus detection by said adjusting unit, whether the object exists in a specific region defined in advance in the image capturing optical system at a distance shorter than a predetermined distance,
   wherein said determination unit determines that the object exists in the specific region when the focusing lens is located in a region on a closest side of a position corresponding to the predetermined distance, said adjusting unit drives the focusing lens using the first driving, and the focusing lens has reciprocally passed through a single peak position of the evaluation value not less than a predetermined reference number of times.

2. The apparatus according to claim 1, further comprising a display unit configured to, when said determination unit determines that the object exists in the specific region, perform display to inform that the object exists in the specific region.

3. The apparatus according to claim 1, further comprising a mode setting unit configured to set an image capturing mode of said image capturing unit to one of a normal image capturing mode and a macro image capturing mode,
   said mode setting unit setting the macro image capturing mode when said determination unit determines that the object exists in the specific region.

4. The apparatus according to claim 1, further comprising a count setting unit configured to set the reference number of times,
   wherein when the focusing lens has reciprocally passed through the single peak position not less than a predetermined number of times, said adjusting unit determines the single peak position as an in-focus position, and
   said count setting unit sets the reference number of times within a range from 0 (exclusive) to the predetermined number of times (exclusive).

5. The apparatus according to claim 4, wherein said count setting unit sets the reference number of times to be larger as a difference between a maximum value and a minimum value of the evaluation value generated by said generation unit becomes smaller.

6. The apparatus according to claim 1, wherein said determination unit does not determine that the object exists in the specific region when a difference between a maximum value and a minimum value of the evaluation value generated by said generation unit is smaller than a threshold.

7. An image capturing apparatus comprising:
   an image capturing unit configured to photoelectrically convert an image of an object formed by an image capturing optical system to generate an image signal;
   a generation unit configured to generate, from the image signal generated by said image capturing unit, an evaluation value representing an in-focus state of the image capturing optical system;
   an adjusting unit configured to, using first driving that drives a focusing lens included in the image capturing optical system along an optical axis direction in a first driving amount and second driving that drives the focusing lens along the optical axis direction in a second driving amount larger than the first driving amount, perform focus detection by adjusting relative positions of said image capturing unit and the focusing lens so as to maximize the evaluation value generated by said generation unit; and a display unit configured to display, during the focus detection by said adjusting unit, that the object exists in a specific region defined in advance in the image capturing optical system at a distance shorter than a predetermined distance, wherein said display unit does not display that the object exists in the specific region until the focusing lens has reciprocally passed through a single peak position of the evaluation value not less than a predetermined number of times.

8. A method of controlling an image capturing apparatus including an image capturing unit configured to photoelectrically convert an image of an object formed by an image capturing optical system to generate an image signal, a generation unit configured to generate, from the image signal generated by the image capturing unit, an evaluation value representing an in-focus state of the image capturing optical system, and an adjusting unit configured to, using first driving that drives a focusing lens included in the image capturing optical system along an optical axis direction in a first driving amount and second driving that drives the focusing lens along the optical axis direction in a second driving amount larger than the first driving amount, perform focus detection by adjusting relative positions of the image capturing unit and the focusing lens so as to maximize the evaluation value generated by the generation unit, the method comprising:

determining, during the focus detection by the adjusting unit, whether the object exists in a specific region defined in advance in the image capturing optical system at a distance shorter than a predetermined distance, wherein in the determining, it is determined that the object exists in the specific region when the focusing lens is located in a region on a closest side of a position corresponding to the predetermined distance, the adjusting unit drives the focusing lens using the first driving, and the focusing lens has reciprocally passed through a single peak position of the evaluation value not less than a predetermined reference number of times.

9. A method of controlling an image capturing apparatus including an image capturing unit configured to photoelectrically convert an image of an object formed by an image capturing optical system to generate an image signal, a generation unit configured to generate, from the image signal generated by the image capturing unit, an evaluation value representing an in-focus state of the image capturing optical system, and an adjusting unit configured to, using first driving that drives a focusing lens included in the image capturing optical system along an optical axis direction in a first driving amount and second driving that drives the focusing lens along the optical axis direction in a second driving amount larger than the first driving amount, perform focus detection by adjusting relative positions of the image capturing unit and the focusing lens so as to maximize the evaluation value generated by the generation unit, the method comprising:

displaying, during the focus detection by the adjusting unit, that the object exists in a specific region defined in advance in the image capturing optical system at a distance shorter than a predetermined distance, wherein in the displaying, that the object exists in the specific region is not displayed until the focusing lens has reciprocally passed through a single peak position of the evaluation value not less than a predetermined number of times.

10. A non-transitory computer-readable storage medium storing a program for controlling an image capturing apparatus including an image capturing unit configured to photoelectrically convert an image of an object formed by an image capturing optical system to generate an image signal, a generation unit configured to generate, from the image signal generated by the image capturing unit, an evaluation value representing an in-focus state of the image capturing optical system, and an adjusting unit configured to, using first driving that drives a focusing lens included in the image capturing optical system along an optical axis direction in a first driving amount and second driving that drives the focusing lens along the optical axis direction in a second driving amount larger than the first driving amount, perform focus detection by adjusting relative positions of the image capturing unit and the focusing lens so as to maximize the evaluation value generated by the generation unit, the program causing a computer to execute:

determining, during the focus detection by the adjusting unit, whether the object exists in a specific region defined in advance in the image capturing optical system at a distance shorter than a predetermined distance, wherein in the determining, it is determined that the object exists in the specific region when the focusing lens is located in a region on a closest side of a position corresponding to the predetermined distance, the adjusting unit drives the focusing lens using the first driving, and the focusing lens has reciprocally passed through a single peak position of the evaluation value not less than a predetermined reference number of times.

11. A non-transitory computer-readable storage medium storing a program for controlling an image capturing apparatus including an image capturing unit configured to photoelectrically convert an image of an object formed by an image capturing optical system to generate an image signal, a generation unit configured to generate, from the image signal generated by the image capturing unit, an evaluation value representing an in-focus state of the image capturing optical system, and an adjusting unit configured to, using first driving that drives a focusing lens included in the image capturing optical system along an optical axis direction in a first driving amount and second driving that drives the focusing lens along the optical axis direction in a second driving amount larger than the first driving amount, perform focus detection by adjusting relative positions of the image capturing unit and the focusing lens so as to maximize the evaluation value generated by the generation unit, the program causing a computer to execute:

displaying, during the focus detection by the adjusting unit, that the object exists in a specific region defined in advance in the image capturing optical system at a distance shorter than a predetermined distance, wherein in the displaying, that the object exists in the specific region is not displayed until the focusing lens has reciprocally passed through a single peak position of the evaluation value not less than a predetermined number of times.

* * * * *